(12) United States Patent
Bosch

(10) Patent No.: US 8,786,445 B2
(45) Date of Patent: Jul. 22, 2014

(54) FISH ID

(76) Inventor: Hugo Bosch, Miami, FL (US)

( * ) Notice: Subject to any disclaimer, the term of this patent is extended or adjusted under 35 U.S.C. 154(b) by 425 days.

(21) Appl. No.: 13/199,872

(22) Filed: Nov. 16, 2011

(65) Prior Publication Data

US 2013/0120148 A1    May 16, 2013

(51) Int. Cl.
*G08B 23/00*    (2006.01)
*A01K 97/00*    (2006.01)

(52) U.S. Cl.
USPC .............................................. 340/573.2; 43/4

(58) Field of Classification Search
None
See application file for complete search history.

(56) References Cited

U.S. PATENT DOCUMENTS

2004/0079019 A1\* 4/2004 Basch .............................. 43/4.5
2011/0192046 A1\* 8/2011 Kinziger ......................... 33/759

\* cited by examiner

*Primary Examiner* — Steven Lim
*Assistant Examiner* — Omeed Alizada
(74) *Attorney, Agent, or Firm* — Hugo Bosch

(57) ABSTRACT

A device for identifying marine species. The device allows the fisherman to quickly identify what specie has been caught, its legal size and the amount of that specific specie that can be collected for recreational or commercial purposes, all this while the specie is still alive, allowing enough time to the fisherman to keep or return to the water the specie that has just been caught.

8 Claims, 4 Drawing Sheets

FISH ID

This invention is a device for identifying marine species. The device allows the fisherman to quickly identify what specie has been caught, its size and the amount of that specific specie that can be legally collected, for recreational or commercial purposes, all this while the specie is still alive, allowing enough time to the fisherman to keep or return to the water the specie that has just been caught. Just point the device to the specie and pull the trigger, the device then process the information and the results will be displayed on the screen. If the size does not comply with existing regulations a message of "specie must be returned to the water as soon as possible" will appear on the screen, on the other hand a message of "You Can Keep it" will appear on the screen if the specie and its size are within the perimeter of what the existing regulations allow. Furthermore if the specie poses a threat to humans due to potential toxicity on contact, a message of "Poisonous Specie on Contact" Return Specie to the water as soon as possible will also appear on the screen.

STATEMENT REGARDING FEDERALLY SPONSORED RESEARCH OR DEVELOPMENT ("No Applicable")

REFERENCE TO SEQUENCE LISTING, A TABLE, OR A COMPUTER PROGRAM LISTING COMPACT DISC APPENDIX ("No Applicable")

BACKGROUND OF THE INVENTION

There is a generalized concern by conservationists and marine life lovers that marine species are being depleted at a fast pace, the purpose of this device is to provide a tool for those, that by lack of knowledge about marine regulations endanger the life and reproduction cycle of marine species. Many marine creatures are being killed every day without having the opportunity to reproduce properly, thus threatening the balance, and as a result also threatening the resources that humans will need to satisfy future feeding needs.

This invention relates to the field of marine electronic devices and its utility to potentially protect marine species could be considerable.

BRIEF SUMMARY OF THE INVENTION

An electronic device to identify marine species, its size and regulations regarding marine species, among the advantages of this electronic device are the followings:

Many marine species would say "THANKS" if they could talk, the day that this electronic device comes to life, because many marine species will remain in their natural habitat as fisherman will have the opportunity to make an informed decision.

Fisherman (including myself) will feel safer knowing that they can count on a device which will help keeping the balance between what is caught and what is left in the water, thus allowing the marine species to develop a harmonious cycle of life and reproduction.

Humans will have the opportunity to behave responsibly if they indeed love the Marine Nature, unfortunately many species are being killed by ignorance and this device could come as a hope to stop that sad practice.

BRIEF DESCRIPTION OF THE SEVERAL VIEWS OF THE DRAWINGS

FIG. 2 also shows a side view of the screen or monitor 1, which visually shows in the form of pictures and text the results of the processed information.

DETAILED DESCRIPTION OF THE INVENTION

Figure 1:
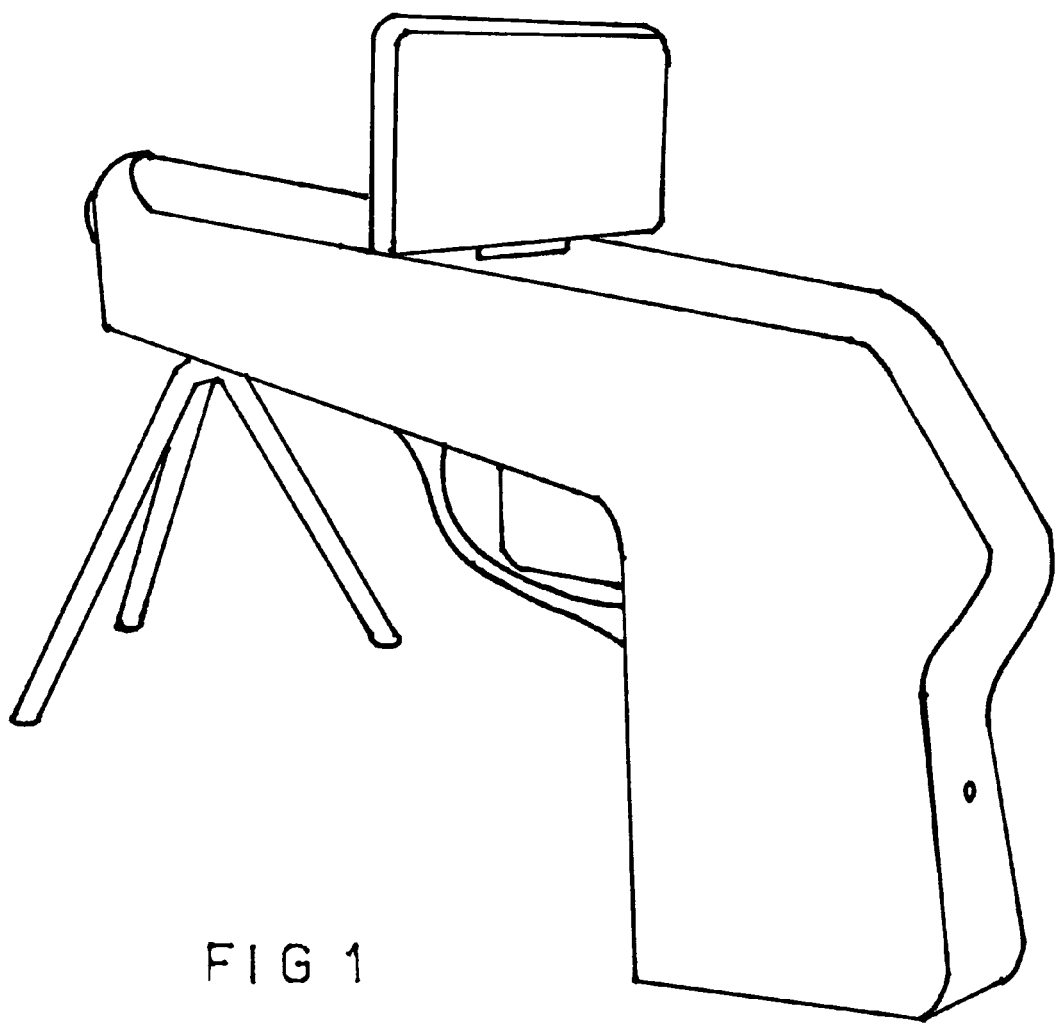
FIG. 1. Shows perspective view of the device.
Figure 2:
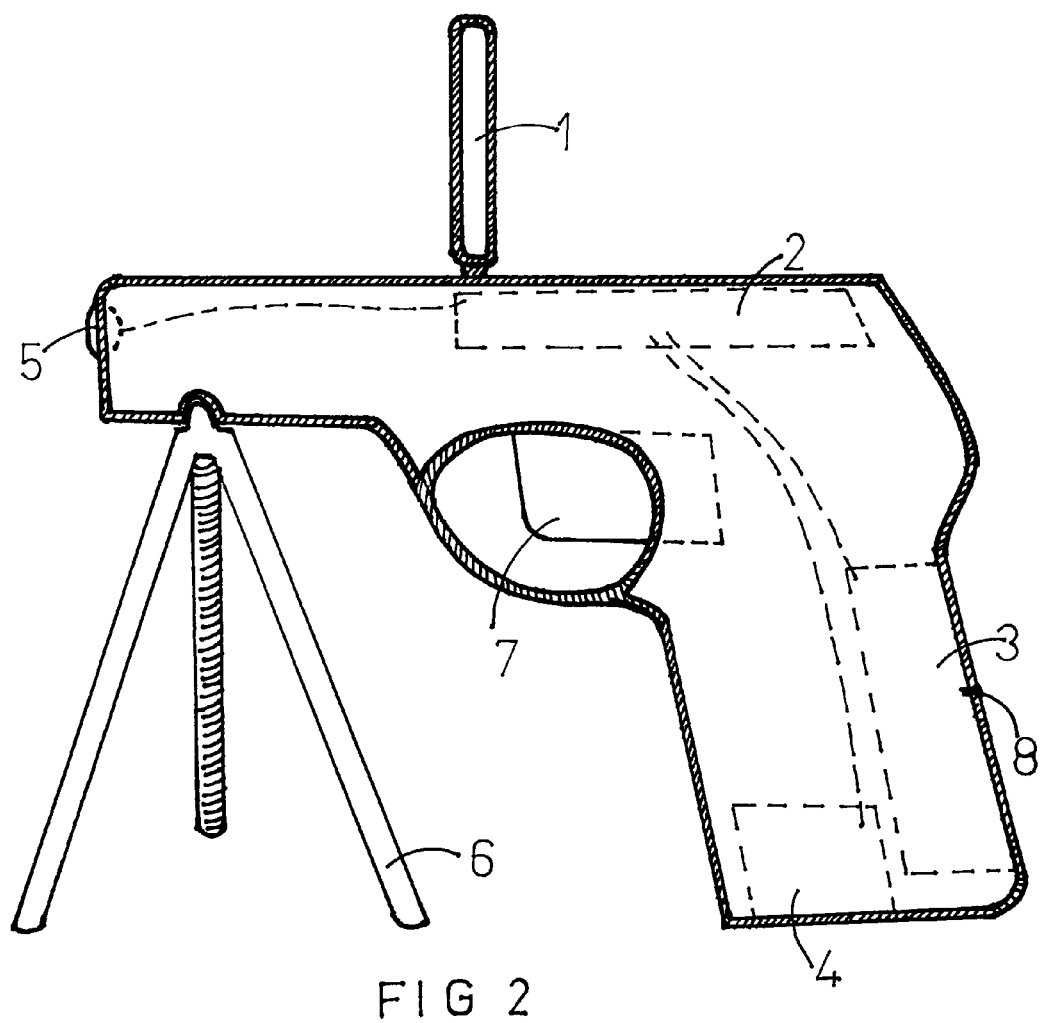
FIG. 2. Shows a side view of the device, a motherboard or electronic tablet 2 which collects and process the visual information received from the optical lens 5 and the information contained in the chip 4, which is loaded with marine regulations, also shows a rechargeable battery 3 which provides DC current to the electronic components of the device when the trigger or interrupter 7 is pressed, also shows an orifice 8 which connects the rechargeable battery to a battery charger, the three legs stand or tripod 6 has been conceived to provide stability to the device when placed on a flat surface.
Figure 3:
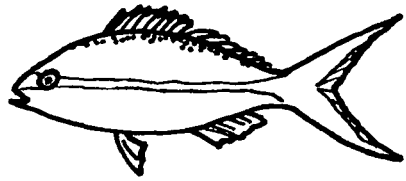
FIG. 3. Shows a front view of the screen or monitor, the text and the picture of the fish are a simulation of how the screen would look under normal working conditions.
Figure 4:
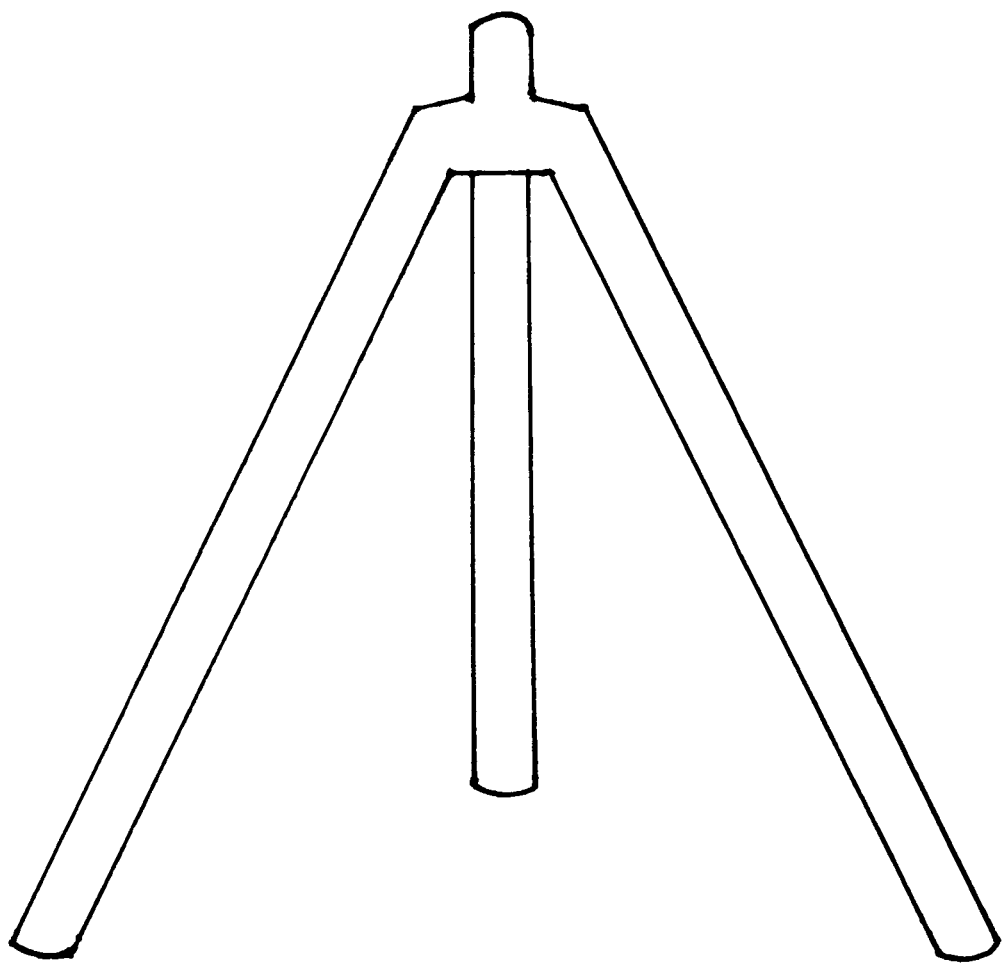
FIG. 4. Shows a front view of the three legs stand or tripod, conceived to provide stability to the device when placed on a flat surface, as mentioned above.

The device should be plastic, plastic so as to reduce its weight, cost of production and possible damage to the deck of the boat in case that it falls.

The device has an optical lens, which is part of the chain of the recognition process.

The device has an electronic tablet or motherboard (small enough to fit inside the device).

The device has a trigger which is nothing more than an interrupter which is responsible of allowing the direct current to go from the battery to the motherboard, once the current reaches the motherboard all of its electronic components will be activated and the device will be ready to work.

The device has a rechargeable battery which is responsible in providing energy to the electronic components, the device has an orifice to properly plug the battery charger.

The device has a chip, which is basically a databank, this chip will contain information about existing marine regulations and marine species, this chip must be loaded periodically in order to have the latest regulations enacted by the competent authorities, the loading process could be either using a designated website or an electronic device properly conceived for that purpose.

The device has a three legs stand or tripod, conceived to provide stability while kept in a vertical position and keeping it from sliding which could make it fall and damage the device.

The device has a small monitor or screen that must be plugged on the upper side of the device, this monitor will be responsible to show to the human eyes all the information processed by the device, in the form of pictures and text.

The software to make this device work has yet to be developed or invented by someone else.

Given the aforementioned parts of the device, the way it works is the following:

As soon as the fisherman lands the marine specie on the boat, points the device to the marine specie, pulls the trigger and there everything begins, the optical lens is the window to the world of the visible, is the eye of the device, that image of the marine specie is received by the motherboard or electronic tablet, the motherboard retrieves the information from the databank which is the chip, and matches whatever information is the databank with the image received by the optical lens, this is basically a comparison process between the image received and the information that is in the chip. The information is processed in the motherboard and then sent to the screen. The result should be an image of the marine specie on the small monitor and text to be read, for example:

Specie: yellow tail (snapper)

Total length: 10 inches

Specie is undersize and must be returned to the water as soon and possible (minimun legal size is 12 inches)

In a different scenario it should be like this:

Specie: yellow tail (snapper)

Total length: 19 inches

Bag limit: 10 per day per harvester (including any other snapper)

You can keep it

What is claimed is:

1. An electronic device for identifying marine species, its size, for collection and returns to the water purposes, and amounts that can be legally collected according to previously established Regulations by State and Federal authorities;

the electronic device further comprising a screen that displays the marine specie, its size, the amount that can be legally collected and a message stating "you can keep it" or "specie must be returned to the water immediately based on the identifying of the marine specie from the electronic device.

2. The electronic device of claim 1 comprising a motherboard or electronic tablet for processing information purposes.

3. The electronic device of claim 1 further comprising an optical lens that should point to the marine specie for visual recognition purposes.

4. The electronic device of claim 1 comprising a chip, previously loaded with marine regulations.

5. The electronic device of claim 1 further comprising a rechargeable battery.

6. The electronic device of claim 1 comprising three legs stands or tripod, for stability purposes.

7. The electronic device of claim 1 comprising a trigger or interrupter to activate its functioning.

8. The electronic device of claim 1 comprising an orifice to plug the battery charger.

\* \* \* \* \*